United States Patent [19]
Bobadilla et al.

[11] Patent Number: 6,134,422
[45] Date of Patent: Oct. 17, 2000

[54] ADJUSTABLE HEIGHT GROUND LEVEL SERVICEABLE CELLSITE

[75] Inventors: Omar Javier Bobadilla, Parsippany; James Vincent Canzonier, Point Pleasant Beach, both of N.J.

[73] Assignee: Lucent Technologies Inc., Murray Hill, N.J.

[21] Appl. No.: 09/109,241

[22] Filed: Jun. 30, 1998

[51] Int. Cl.$^7$ .............................. H04B 1/38; H01Q 1/12; B66B 1/00; B66C 23/06

[52] U.S. Cl. ........................... 455/90; 343/890; 343/891; 254/387; 52/111; 455/562

[58] Field of Search ................................. 455/561, 562, 455/90, 550, 575, 422, 403; 343/877, 890, 891; 52/121, 111, 40, 736.2, 114, 117, 119; 248/295.11, 297.11, 297.21, 218.4; 254/387, 362

[56] References Cited

U.S. PATENT DOCUMENTS

| | | | |
|---|---|---|---|
| 4,607,389 | 8/1986 | Halgrimson | 455/11 |
| 4,850,558 | 7/1989 | Leschot | 248/297.1 |
| 5,570,546 | 11/1996 | Butterworth et al. | 52/111 |
| 5,880,701 | 3/1999 | Bhame et al. | 343/890 |
| 5,963,178 | 10/1999 | Jones | 343/890 |
| 5,969,689 | 10/1999 | Martek et al. | 343/879 X |
| 5,995,063 | 11/1999 | Somoza et al. | 343/890 |

*Primary Examiner*—Nay Maung
*Assistant Examiner*—Tracy M. Legree
*Attorney, Agent, or Firm*—Jimmy Goo

[57] ABSTRACT

The present invention is a base station that may be adjusted to varying altitudes along a vertical support but will not temporarily suspend wireless communications services to all mobile telephones within its associated cell when being serviced. In one embodiment, the base station of the present invention comprises a plurality of micro-cells and a plurality of independently moveable carriages. Each of the plurality of micro-cells being associated with a sector of a cell, and comprising a radio unit and a directional antenna for providing wireless communications services to mobile telephones within the associated sector. Each of the micro-cells are mounted to one of the plurality of carriages, which are independently and moveably mounted to a vertical support. Advantageously, if one of the micro-cells is in need of servicing, the carriage to which such micro-cell is mounted can be independently lowered to ground level for servicing the micro-cell without suspending wireless communications services provided by other micro-cells to mobile telephones in other sectors of the cell. Furthermore, each of the micro-cells belonging to a single base station may be positioned to different altitudes along the vertical support such that each micro-cell can provide optimum RF coverage based on the terrain of the associated sector.

18 Claims, 2 Drawing Sheets

ADJUSTABLE HEIGHT GROUND LEVEL SERVICEABLE CELLSITE

FIELD OF THE INVENTION

The present invention relates generally to wireless communications systems and, in particular, to adjustable height cellsites.

BACKGROUND OF THE RELATED ART

FIG. 1 depicts a schematic diagram of a portion of a typical wireless communications system 10. The wireless communications systems 10 comprises a mobile switching center (MSC) 12 and a plurality of base stations 14-$i$. MSC 12 is connected to each of base stations 14-$i$ and a public switching telephone network (PSTN) 16. Each base station 14-$i$ includes a radio unit and antennas connected to the radio unit for providing wireless communications services to mobile telephones 18-$j$ within an associated geographical coverage area referred to herein as a cell 20-$i$, and is operable to manage radio channel resources belonging to that base station 14-$i$. Power supplies, not shown, provide electrical power to the base stations 14-$i$.

The antennas are mounted on a vertical support at an altitude sufficient to provide the base station 14-$i$ with optimum radio frequency (RF) coverage to mobile telephones 18-$j$ within cell 20-$i$. The antennas may be omnidirectional or directional depending on whether the cell is sectorized, i.e., divided into sectors A, B, C. Typically, cells are sectorized in order to reduce cost by decreasing the total number of base stations needed to serve mobile telephones 18-$j$. If a cell is sectorized, each base station 14-$i$ will have a directional antenna for transmitting and receiving signals to and from mobile telephones 18-$j$ within each sector. Typically, the cells are sectorized into three sectors, and the directional antennas provide approximately 120° of RF coverage for each sector.

The radio unit comprises a plurality of radios for modulating, transmitting, receiving and demodulating radio signals. The radio unit is usually connected to the directional antennas by electrical connections and positioned near the base of the vertical support such that it is serviceable at ground level. In one embodiment of the prior art, the radio unit and the antennas are mounted on an adjustable platform that may be collectively positioned at varying altitudes along the vertical support. See FIG. 2, which depicts a base station 60 having three directional antennas 62-$t$, a radio unit 64 and a power supply 66, wherein the power supply includes a direct current power supply and means for converting alternating current to direct current.

The configuration of FIG. 2 has several advantages: first, the position of the antennas and the radio control unit may be re-positioned to a different altitude in the event of a terrain change within the cell; second, the antennas and the radio unit may be positioned to an altitude along the vertical support that makes them inaccessible to vandals; third, the antennas and the radio unit may be lowered such that they are serviceable at ground level (by lowering the adjustable platform to ground level). However, when any of the antennas and/or the radio unit need to be serviced, the base station will temporarily disrupt wireless communications services to all mobile telephones within its associated cell when the adjustable platform is lowered to ground level to be serviced. Accordingly, there exists a need for a base station that provides the advantages associated with the pr io r art base stations without the aforementioned disadvantage.

SUMMARY OF THE INVENTION

The present invention is a base station that may be adjusted to varying altitudes along a vertical support but will not temporarily suspend wireless communications services to all mobile telephones within its associated cell when being serviced. In one embodiment, the base station of the present invention comprises a plurality of micro-cells and a plurality of independently moveable carriages. Each of the plurality of micro-cells being associated with a sector of a cell, and comprising a radio unit and a directional antenna for providing wireless communications services to mobile telephones within the associated sector. Each of the micro-cells are mounted to one of the plurality of carriages, which are independently and moveably mounted to a vertical support. Advantageously, if one of the micro-cells is in need of servicing, the carriage to which such micro-cell is mounted can be independently lowered to ground level for servicing the micro-cell without suspending wireless communications services provided by other micro-cells to mobile telephones in other sectors of the cell. Furthermore, each of the micro-cells belonging to a single base station may be positioned to different altitudes along the vertical support such that each micro-cell can provide optimum RF coverage based on the terrain of the associated sector.

BRIEF DESCRIPTION OF THE DRAWINGS

The features, aspects, and advantages of the present invention will become better understood with regard to the following description, appended claims, and accompanying drawings where:

DETAILED DESCRIPTION

Figure 1:
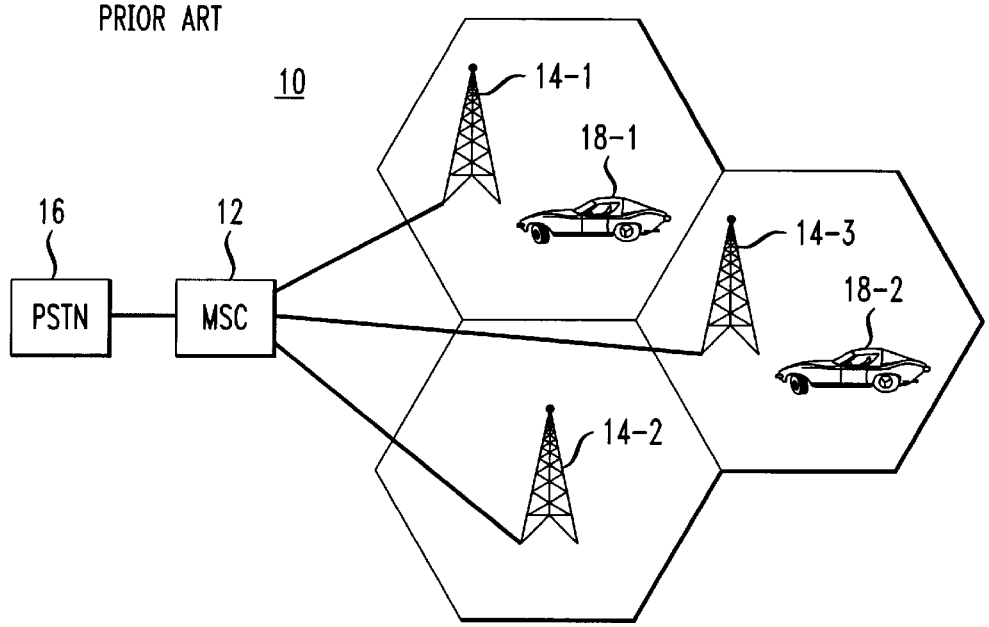
FIG. 1 depicts a schematic diagram of a portion of a typical wireless communications system.
Figure 2:
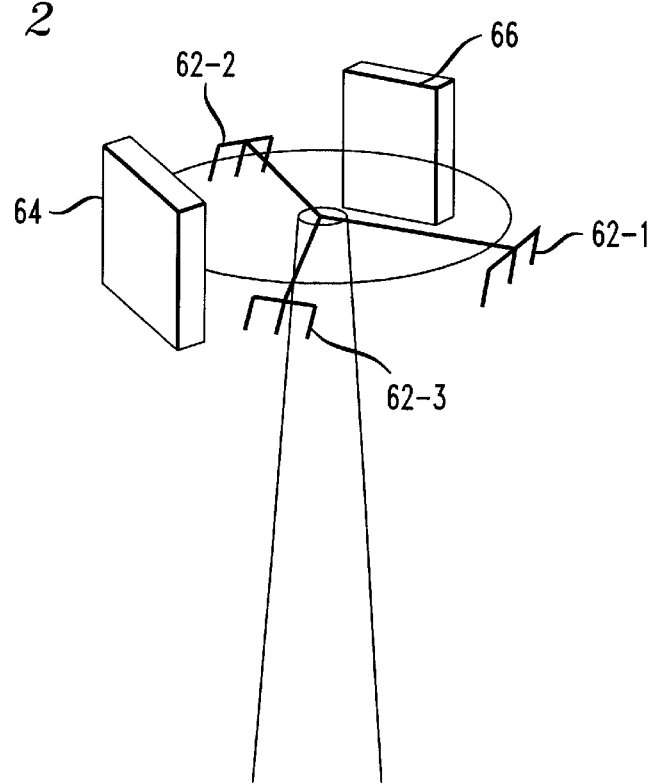
FIG. 2 depicts a prior art adjustable height ground level serviceable base station.
Figure 3:
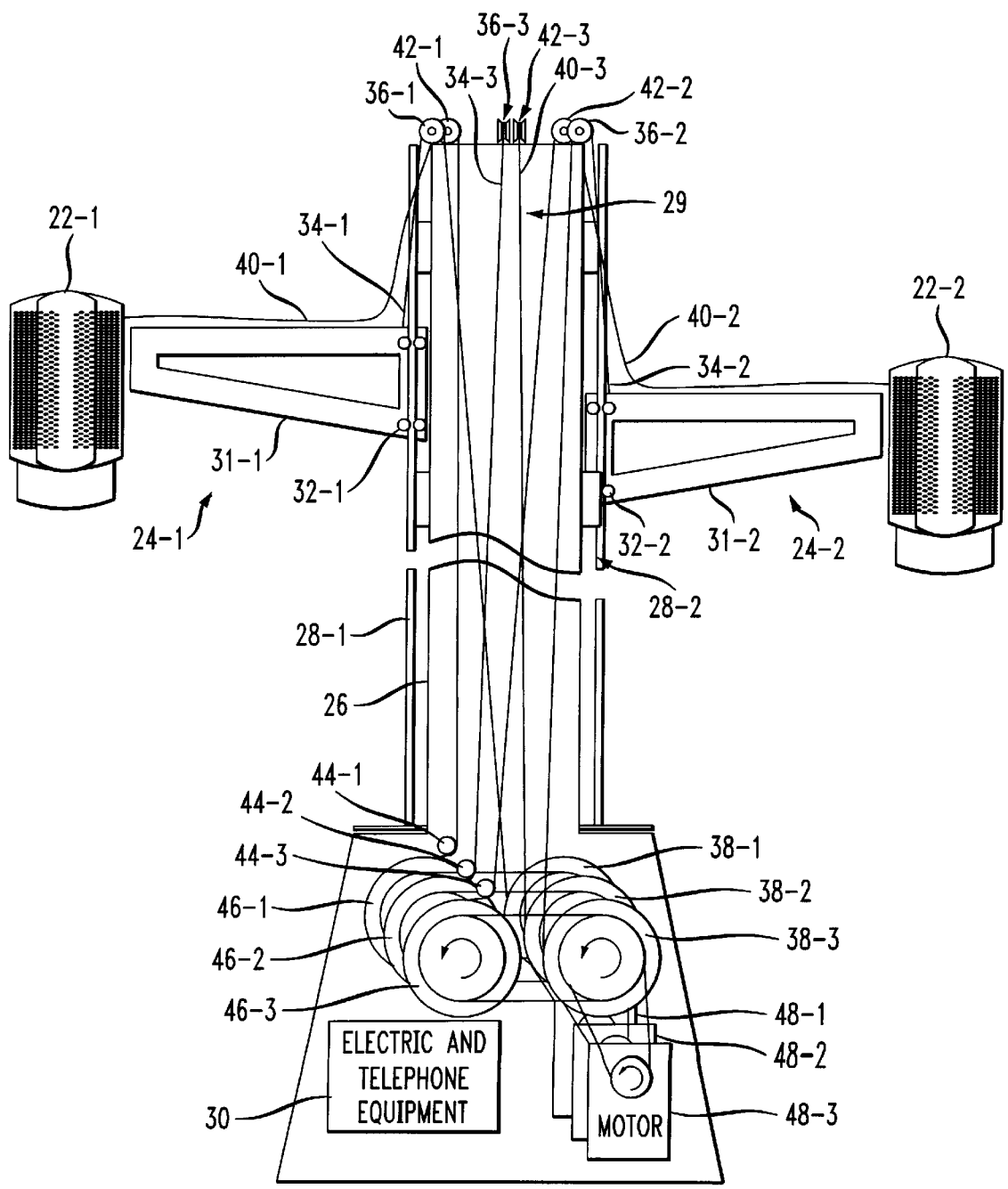
FIG. 3 depicts an adjustable height ground level serviceable base station for providing wireless communications services to mobile telephones within a sectorized cell in accordance with one embodiment of the present invention.

FIG. 3 depicts a cross sectional view of a base station 20 for providing wireless communications services to mobile telephones within a sectorized cell in accordance with one embodiment of the present invention. Base station 20 comprises micro-cells 22-$k$, a vertical support 26 (such as a tower, pole, shaft, column, post, pillar, etc.), an adjustable mounting system for independently adjusting the vertical positions of micro-cells 22-$k$ along vertical support 26, and electric/telephone equipment 30, as will be described herein. Each micro-cell 22-$k$ is associated with a sector of a cell, and comprises a radio unit and a directional antenna for providing wireless communications services to mobile telephones within the associated sector, wherein the radio unit includes a plurality of radios for modulating, transmitting, receiving and de-modulating radio signals using one or more frequencies, and the directional antennas provide 1204° of radio frequency (RF) coverage to each sectors (e.g. 120° of RF coverage). Each micro-cell 22-$k$ may also include an alternating current to direct current (AC/DC) converter for converting alternating current from electric/telephone equipment 30 to direct current for use by the radio unit.

In one embodiment, the adjustable mounting system includes external vertical guide rails 28-$k$ affixed to vertical support 26, carriages 24-$k$, and a cabling system 29. For purposes of illustration, this embodiment of the adjustable mounting system will be described herein. This should not be construed to limit the present invention in any manner. Other adjustable mounting systems for independently adjusting the vertical positions of micro-cells 22-$k$ are possible.

Micro-cells 22-*k* are mounted to carriages 24-*k*, which are slidably mounted to vertical guide rails 28-*k*. Each carriage 24-*k* includes a member 31-*k* to which micro-cell 22-*k* is mounted, and a plurality of guide wheels 32-*k* for facilitating the movement of carriage 24-*k* along vertical guide rails 28-*k*. Vertical guide rails 28-k preferably span the entire length of vertical support 26 such that micro-cells 22-*k* may be lowered to ground level (e.g., base of along vertical guide rails 28-*k*. Vertical guide rails 28-*k* preferably span the entire length of vertical support 26 such that micro-cells 22-*k* may be lowered to ground level (e.g., base of vertical support 26) for servicing, and positioned at any height along vertical support 26. Although FIG. 3 depicts a base station with three micro-cells (the third micro-cell is obstructed by vertical support 26), other configurations of the base station are possible. Thus, the present invention should not be limited to base stations having three micro-cells.

Cabling system 29 serves at least two functions. First, cabling system 29 controls the movement of carriages 24-*k*. Second, cabling system 29 couples micro-cells 22-*k* to electric/telephone equipment 30. One embodiment of cabling system 29 is shown in FIG. 3. In this embodiment, cabling system 29 comprises hoisting cables 34-*k*, hoisting cable guide pulleys 36-*k*, hoisting cable reels 38-*k*, electrical/communication cables 40-*k*, electrical cable guide pulleys 42-*k* and 44-*k*, electrical cable reels 46-*k*, and motorized winches 48-*k*.

The ends of hoisting cables 34-*k* are attached to carriages 24-*k* and hoisting cable reels 38-*k*. From carriages 24-*k*, hoisting cables 34-*k* are directed over the top of vertical support 26 via hoisting cable guide pulleys 36-*k*toward hoisting cable reels 38-*k*. Motorized winches 48-*k* turn hoisting cable reels 38-*k* clockwise and/or counter-clockwise via belts 50-*k* such that hoisting cables 34-*k* may be spooled or un-spooled about hoisting cable reels 38-*k*, thereby causing carriages 24-*k* to be independently raised or lowered. Electrical power, such as alternating current, is supplied to motorized winches 40 via electric/telephone equipment 30.

Electric/telephone equipment 30 is stored within the base of vertical support 26 for supplying base station 20 (including motorized winches 48-*k*) with electrical power (such as alternating current which is converted to direct current at the micro-cells) and a land connection to a mobile switching center (MSC), not shown. Electric/telephone equipment 30 is coupled to each of the plurality of micro-cells 22-*k* via electrical/communication cables 40-*k*. From micro-cell 22-*k*, electrical/communication cables 40-*k* are directed over the top of vertical support 26 via electrical cable guide pulleys 42-*k*, and toward electrical cable reels 46-*k* and electric/telephone equipment 30 via electrical cable guide pulleys 44-*k*. Motorized winches 48-*k* turn electrical cable reels 46-*k* clockwise and/or counter-clockwise via belts 52-*k* and hoisting cable reels 38-*k* such that electrical/communication cables 40-*k* may be wound or un-wound about electrical cable reels 38-*k*. Note that cabling system 29 should be designed to cause electrical and hoisting cable reels 46-*k*, 38-*k* to perform identical actions to electrical and hoisting cables 40-*k*, 34-*k*, respectively—that is, the electrical and hoisting cables 40-*k*, 34-*k* should either spool or unspool about the electrical and hoisting cable reels 46-*k*, 38-*k* at the same rate.

Advantageously, cabling system 29 is operable to move carriages 24-*k* up and down vertical support 26 and provide an electrical connection between micro-cells 22-*k* and electric/telephone equipment 30 without causing either electrical and hoisting cables 40-*k*, 34-*k* to become tangled or disconnected from electric/telephone equipment 30 or any of the micro-cells 22-*k* when carriages 24-*k* are being raised or lowered.

Although the present invention has been described in considerable detail with reference to certain embodiments, other versions are possible. For example, the adjustable mounting system could use a rack and pinion assembly with a reversible motor to re-position each carriage vertically, or a threaded screw with a reversible motor to re-position each carriage vertically. In another example, the plurality of micro-cells may include a first micro-cell operable to transmit and/or receive signals using a first frequency and a second micro-cell operable to transmit and/or receive signals using a second frequency, wherein the first and second frequency are the same or different. Therefore, the spirit and scope of the present invention should not be limited to the description of the embodiments contained herein.

We claim:

1. A base station comprising:

a vertical support;

a plurality of micro-cells, each of the plurality of micro-cells providing wireless communications services to mobile telephones within a sector of a cell;

an adjustable mounting system for independently and vertically positioning each of the plurality of micro-cells along the vertical support.

2. The base station of claim 1, wherein each of the plurality of micro-cells comprises:

a radio unit having a plurality of radios for modulating, transmitting, receiving and demodulating radio signals; and a plurality of antennas connected to the radio unit for providing radio frequency coverage to the cell.

3. The base station of claim 2, wherein each of the plurality of micro-cells comprises:

an alternating current to direct current converter coupled to the radio unit.

4. The base station of claim 2, wherein each of the plurality of antennas provide 120° of radio frequency coverage to a sector of the cell.

5. The base station of claim 1, wherein the adjustable mounting system comprises:

a hoisting system having hoisting cables for lifting and lowering the micro-cells; and a cabling system having electrical/communication cables coupled to the plurality of micro-cells for the transmission of electrical power and communication signals to and from the plurality of micro-cells.

6. The base station of claim 5, wherein the adjustable mounting system further comprises:

a plurality of carriages to which the plurality of micro-cells are mounted, the hoisting cables being attached to the plurality of carriages for lifting and lowering the plurality of carriages.

7. The base station of claim 5 further comprising:

external vertical guide rails affixed to the vertical support to guide the plurality of carriages along the vertical support as the plurality of carriages are being lifted or lowered.

8. The base station of claim 5, wherein the hoisting system further comprises:

a plurality of pulleys for guiding the hoisting cables over the vertical support;

a plurality of reels for spooling and un-spooling the hoisting cables; and a winch for clockwise and counter-clockwise rotating the plurality of reels.

9. The base station of claim 5, wherein the cabling system further comprises:
   a plurality of pulleys for guiding the electrical/communication cables over the vertical support;
   a plurality of reels for spooling and un-spooling the electrical/communication cables; and
   a winch for clockwise and counter-clockwise rotating the plurality of reels.

10. The base station of claim 5 further comprising:
    an electric/telephone equipment coupled to the electrical/communication cables for providing electrical power to the micro-cells and a wired connection to the micro-cells from a mobile switching center.

11. The base station of claim 1 further comprising:
    an electric/telephone equipment for providing electrical power to the micro-cells and a wired connection to the micro-cells from a mobile switching center.

12. The base station of claim 1, wherein the adjustable mounting system further comprises:
    a plurality of carriages to which the plurality of micro-cells are mounted.

13. The base station of claim 12, wherein each of the plurality of carriages comprise:
    a plurality of guide wheels for facilitating movement of micro-cells along the vertical support; and
    a member to which the micro-cells and the plurality of guide wheels are affixed.

14. The base station of claim 13 further comprising:
    external vertical guide rails affixed to the vertical support to guide the plurality of guide wheels along the vertical support.

15. The base station of claim 1, wherein the adjustable mounting system is operable to individually lower the plurality of micro-cells to ground level.

16. The base station of claim 1, wherein the plurality of micro-cells include a first micro-cell transmitting signals using a first frequency and a second micro-cell transmitting signals using a second frequency.

17. The base station of claim 16, wherein the first frequency and the second frequency are identical.

18. The base station of claim 16, wherein the first frequency and the second frequency are different.

* * * * *